Dec. 22, 1925.

R. DENELS 1,566,839

BUMPER PROTECTOR CUSHION

Filed May 14, 1925

WITNESSES
H. J. Walker
Chris Finle.

INVENTOR
R. Denels
BY
ATTORNEYS

Patented Dec. 22, 1925.

1,566,839

UNITED STATES PATENT OFFICE.

ROBERT DENELS, OF NEW YORK, N. Y.

BUMPER PROTECTOR CUSHION.

Application filed May 14, 1925. Serial No. 30,289.

*To all whom it may concern:*

Be it known that I, ROBERT DENELS, a citizen of the United States, and a resident of the city of New York, borough of Manhattan, in the county and State of New York, United States of America, have invented a new and Improved Bumper Protector Cushion, of which the following is a full, clear, and exact description.

It has been observed and experienced that bumpers such as those used upon automobiles are efficient and effectual for the purpose of preventing the less invulnerable parts of the colliding vehicles from being damaged or harmed by encountering parts of the collided vehicles, but such bumpers do damage such as scratching, mutilating and sometimes breaking parts of the collided vehicles, due to the fact that the bumpers are not pliant or resilient as well as flexible.

It is therefore the prime object of the present invention to associate means with any ordinary type of vehicle bumper for rendering the same innocuous to the extent that it will not scratch or mutilate parts of other vehicles, and will also thwart the tendency of the bumpers to break other parts.

Another object of the invention is to produce a protecting cushion which may be removably associated with vehicle bumpers for the purposes mentioned.

Another object of the invention is to produce a protecting cushion for vehicle bumpers which may be made of rubber of different colors.

With the foregoing, other objects of the invention will appear from the embodiment of the invention, which by way of example is described in the following specification and illustrated in the accompanying drawings, in which—

Figure 1:
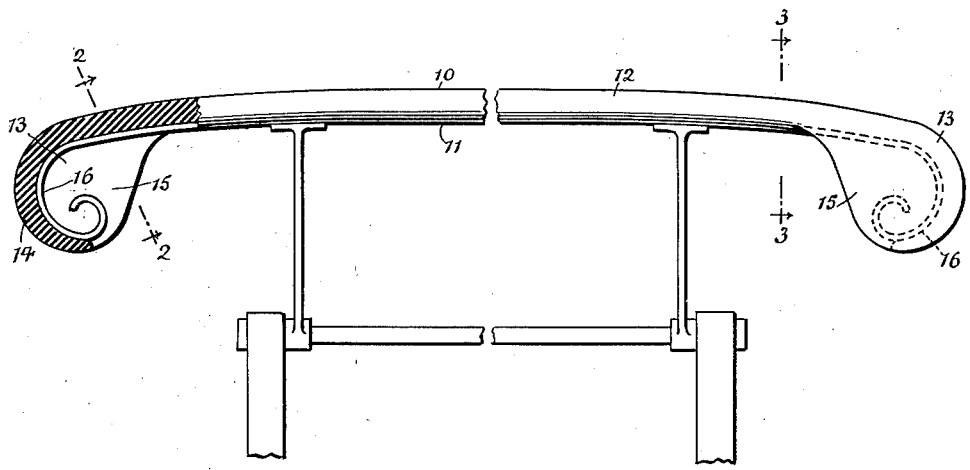
Figure 1 is in part a sectional plan view, and illustrating a common type of vehicle bumper with the protecting cushion of the present invention associated therewith.
Figure 2:
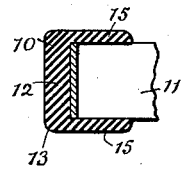
Fig. 2 is a cross section taken on the line 2—2 of Fig. 1 and looking in the direction indicated by the arrows.
Figure 3:
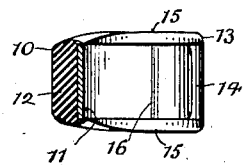
Fig. 3 is a sectional view taken on the line 3—3 of Fig. 1, and looking in the direction of the arrows.

As before stated, the present invention contemplates a more perfect vehicle bumper by associating therewith means which will make the same pliant or resilient as well as flexible. To this end there is therefore provided an element 10 which may be removably associated with a bumper 11. Inasmuch as there are many types of bumpers employed upon the running gears of automobiles, it is to be understood that the protecting and cushioning element 10 may be varied in size and shape to be applicable to different types of bumpers. In the present instance the element 10 is made of a single piece of rubber to provide a pliable or resilient body 12 and attaching means 13 therefor at the opposite ends of the body 12. The attaching means 13 at each end of the body 12, being of the same material as the body 12 will be expansible and in the nature of a pocket. Such pockets each will consist of an end portion or wall 14 and side portions or walls 15. Since mostly all of the bumpers in use as mounted upon vehicles provide free extremities, such as the extremities 16, it will be readily possible to associate the element 10 with such a bumper by inserting the extremities 16 respectively in the pockets 13. It is to be understood that the body 12 will have sufficient elasticity to permit the same to be stretched so that it will be an easy matter to bring about the insertion of the extremity 16 into the pockets 13. It will simply be necessary to arrange one of the pockets 13 over one of the extremities 16 and then stretch the body 12 sufficiently to permit the other pocket 13 to be snapped over the other extremity 16.

Since the element 10 is made of a high grade of rubber, it is possible to make the same of different colors. The color of a particular element 10 may be made to correspond or to be in contrast with the particular color of the vehicle body and therefore add to the appearance of the vehicle, and unlike a coating of paint or enamel there will be no coating or surface which can be effaced or marred.

While there has been shown a bumper protecting cushion especially suitable for use in conjunction with a special type of bumper, it is to be understood that no limitations are necessarily made, as changes, modifications and alterations of the construction may be resorted to to meet particular demands of other types of bumpers without departing from the spirit and scope of the appended claims.

I claim:

1. A bumper protecting cushion comprising an element made of a single piece of rubber to provide a pliable and elastic body, and an expansible bumper end receiving pocket at each end of said body.

2. A bumper protecting cushion consisting of a pliable and elastic body, and an expansible means on the opposite ends of the body for engaging the opposite ends of a bumper to hold the cushion in place on the bumper in contact therewith throughout its length.

ROBERT DENELS.